(12) United States Patent
Allan et al.

(10) Patent No.: US 7,710,901 B2
(45) Date of Patent: May 4, 2010

(54) GMPLS CONTROL OF ETHERNET

(75) Inventors: David Allan, Ottawa (CA); Donald Fedyk, Groton, MA (US)

(73) Assignee: Nortel Networks Limited, St. Laurent, Quebec (CA)

( * ) Notice: Subject to any disclaimer, the term of this patent is extended or adjusted under 35 U.S.C. 154(b) by 567 days.

(21) Appl. No.: 11/580,796

(22) Filed: Oct. 13, 2006

(65) Prior Publication Data

US 2007/0086455 A1    Apr. 19, 2007

Related U.S. Application Data

(60) Provisional application No. 60/726,788, filed on Oct. 14, 2005.

(51) Int. Cl.
*H04L 12/28* (2006.01)

(52) U.S. Cl. .................. 370/254; 370/408; 370/410; 709/220; 709/238

(58) Field of Classification Search .................. None
See application file for complete search history.

(56) References Cited

U.S. PATENT DOCUMENTS

| | | | | |
|---|---|---|---|---|
| 5,914,938 | A * | 6/1999 | Brady et al. ................ | 370/254 |
| 6,266,705 | B1 * | 7/2001 | Ullum et al. ................ | 709/238 |
| 6,563,832 | B1 | 5/2003 | Stuart et al. | |
| 6,618,388 | B2 * | 9/2003 | Yip et al. .................... | 370/401 |
| 6,956,868 | B2 | 10/2005 | Qiao | |
| 2003/0067928 | A1 * | 4/2003 | Gonda ........................ | 370/401 |
| 2004/0042406 | A1 * | 3/2004 | Wu et al. .................... | 370/238 |
| 2004/0076151 | A1 * | 4/2004 | Fant et al. ................... | 370/389 |
| 2004/0095922 | A1 * | 5/2004 | Sasagawa ................... | 370/351 |
| 2004/0103209 | A1 | 5/2004 | Kinoshita et al. | |
| 2005/0138149 | A1 * | 6/2005 | Bhatia ........................ | 709/220 |
| 2005/0160180 | A1 * | 7/2005 | Rabje et al. ................. | 709/238 |

OTHER PUBLICATIONS

L. Berger, "Generalized Multi-Protocol Label Switching (GMPLS) Signaling Resource ReserVation Protocol-Traffic Engineering (RSVP-TE) Extensions", Jan. 2003.*

* cited by examiner

*Primary Examiner*—Daniel J Ryman
*Assistant Examiner*—Brian Roberts
(74) *Attorney, Agent, or Firm*—Pearne & Gordon LLP

(57) ABSTRACT

Ethernet provider backbone transport (PBT) paths are controlled utilizing Generalized Multi-protocol Label Switching (GMPLS) signaling protocol. A path between edge nodes is identified by a combination of a VID and destination MAC address in a VID/MAC tuple populated in the forwarding tables of intermediary nodes. To establish the PBT path, a path calculation is performed from the originator node to the terminator node through the network. The originating node then sends a GMPLS label object with a suggested VID/MAC to identify the path to the terminator. The intermediary nodes or bridges forward the object to the terminating node. The terminating node then offers a VID/MAC tuple in a GMPLS label object in response. When the intermediary nodes forward the response from the terminating node to the originator, the appropriate forwarding labels are then installed in the forwarding tables of each node utilizing the associated VID/MAC tuples.

14 Claims, 6 Drawing Sheets

GMPLS CONTROL OF ETHERNET

CROSS-REFERENCE TO RELATED APPLICATIONS

This application claims priority on U.S. Provisional Patent Application Ser. No. 60/726,788 filed Oct. 14, 2005 which is hereby incorporated by reference.

TECHNICAL FIELD

The present invention relates to GMPLS signaling and particularly to configuring Ethernet capable switches in order to configure Ethernet switched paths.

BACKGROUND

Ethernet switches are growing in capability. As a consequence the role of Ethernet is rapidly expanding in networks that were the domain of other technologies such as SONET/SDH TDM and ATM. The question of how Ethernet will evolve and what capabilities it can offer in these areas is still under development.

Ethernet as specified today is a system. How spanning tree, data plane flooding and MAC learning combine to populate forwarding tables and produce resilient any-to-any behavior in a bridged network is well understood. What is less obvious is that the resulting behavior is purely a consequence of this particular combination of functions combined with what the underlying hardware can do, and that by simply disabling some Ethernet functionality, it is possible to employ alternative control planes and obtain different forwarding behaviors.

It is desirable to be able to drive Ethernet towards increasingly deterministic behavior. One behavior of note is that of Provider Backbone Transport (PBT) as disclosed in commonly assigned U.S patent application No. US20050220096 filed Apr. 4, 2004 and hereby incorporated by reference. Using PET, Ethernet switches may perform PBT MAC forwarding on the basis of a statically configured VID/MAC tuple. This means the forwarding hardware performs a full 60 bit lookup (VID(12)+MAC DA (48)) only requiring uniqueness of the full 60 bits for forwarding to resolve correctly.

Generalized Multi-protocol Label Switching (GMPLS) extends MPLS to provide the control plane (signaling and routing) for devices that switch in any of these domains: packet, time, wavelength, and fiber. GMPLS signaling is well suited to setup paths with labels but it does require a minimal IP control plane and IP connectivity so it is suited to certain scenarios where a large number of paths or dynamic path management is required. The common control plane promises to simplify network operation and management by automating end-to-end provisioning of connections, managing network resources, and providing the level of QoS that is expected in the new, sophisticated applications.

As Ethernet expands into provider network these is a need to leverage the benefits of GMPLS deterministic behavior with the flexibility of Ethernet.

Accordingly, systems and methods that enable the configuration of Ethernet switch paths is highly desirable in a GMPLS environment.

SUMMARY

A method, system and node for controlling Ethernet provider backbone transport (PBT) paths utilizing Generalized Multi-protocol Label Switching (GMPLS) signaling protocol are provided. PBT provides a defined path through a network between edge nodes. The path is identified by a combination of a VID and destination MAC address in a unique VID/MAC tuple. The VID/MAC tuple is installed in forwarding tables of intermediary nodes so that any packets between the edges nodes traverse by the defined path through the network. Utilizing GMPLS enables the PBT path to be established through signaling rather than by individual configuration of each node.

In order to establish a PBT path, a path calculation must be performed from the originator node to the terminator node. The calculation may be performed based upon the network topology at the originator node or done centrally if required. The originating node sends a GMPLS label object with an offered VID/MAC to PBT identify the path to the terminator. The terminating node then offers a VID/MAC tuple in response for the path using a GMPLS label object. The nodes can select the VID from a range of allocated PBT VIDs. While a VID in the allocated range is not unique on an Ethernet sub-network basis, the VID/MAC DA tuple is. When the intermediary nodes forward the response from the terminating node to the originator, the appropriate forwarding labels are then installed in the forwarding tables of each intermediary node utilizing the associated VID/MAC tuples to identify the path between edge nodes. Any future traffic between the edge nodes are identified by the VID/MAC tuple and forwarded by the defined path.

GMPLS label objects from the originating node to the terminator node can utilize a UPSTREAM_LABEL object to send the VID/MAC, while the terminator may use GENERALIZED_LABEL object in a RESV message to respond with a VID/MAC. Upon seeing the RESV message the intermediary nodes install forwarding entries from the objects based upon the VID/MAC so that future traffic will transit by the appropriate path. The unique combination of the VID/MAC ensures consistent forwarding of traffic through the network and the use of GMPLS enables end to end configuration of paths using a common control plane.

Thus, an aspect of the present subject matter provides a method of utilizing Generalized Multi-protocol Label Switching (GMPLS) to control Ethernet provider backbone transport (PBT) paths, the method comprising the steps of determining paths from a originating edge node to a terminating edge node through a plurality of intermediary nodes; sending, from the originating node to the terminating node, a first offered GMPLS label for identifying the path, the GMPLS labels containing a backbone virtual-LAN identifier and a media-access-control (MAC) in a first VID/MAC tuple; installing the first VID/MAC tuple in forwarding tables at each intermediary bridge node from the originating node to the terminating node.

A further aspect of the present subject matter provides an Ethernet network, utilizing Generalized Multi-protocol Label Switching (GMPLS) for establishing provider backbone transport (PBT) paths, the network comprising an originating edge node; a terminating edge node; a plurality of intermediary bridge nodes forming a mesh between the originating and terminating edge nodes; and wherein a path is defined between the originating edge node and a terminating edge node by a backbone virtual-LAN identifier and a media-access-control (MAC) of the respective destination nodes forming a VID/MAC tuple and each of the intermediary nodes receives label information from the GMPLS label containing the VID/MAC tuple for populating forwarding tables to route data between the originating edge node and the terminating edge node by the defined path.

Yet another aspect of the present subject matter provides an Ethernet bridging node in a mesh network, the node implementing the step of receiving at the bridging node an offered Generalized Multi-protocol Label Switching (GMPLS) label from an edge node, the GMPLS label identifying a provider backbone transport (PBT) path through the mesh network between edge nodes, the GMPLS labels containing a backbone virtual-LAN identifier (VID) and a media-access-control (MAC) address associated with the edge node in a VID/MAC tuple; installing the VID/MAC tuple from the GMPLS label in a forwarding table of the bridging node, the VID/MAC tuple for identifying an egress port of the node associated with the PBT path, wherein packets received at an ingress port of the bridging node are forwarded to the egress port of the bridging node based on VID/MAC tuples in the packets; and forwarding GMPLS label to the next node along the PBT path toward the opposite edge node of the PBT path.

Other aspects and features of the present invention will become apparent to those ordinarily skilled in the art upon review of the following description of specific embodiment of the invention in conjunction with the accompanying figures.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

Embodiments of the present invention are described below, by way of example only, with reference to FIGS. 1-6.

Figure 1:
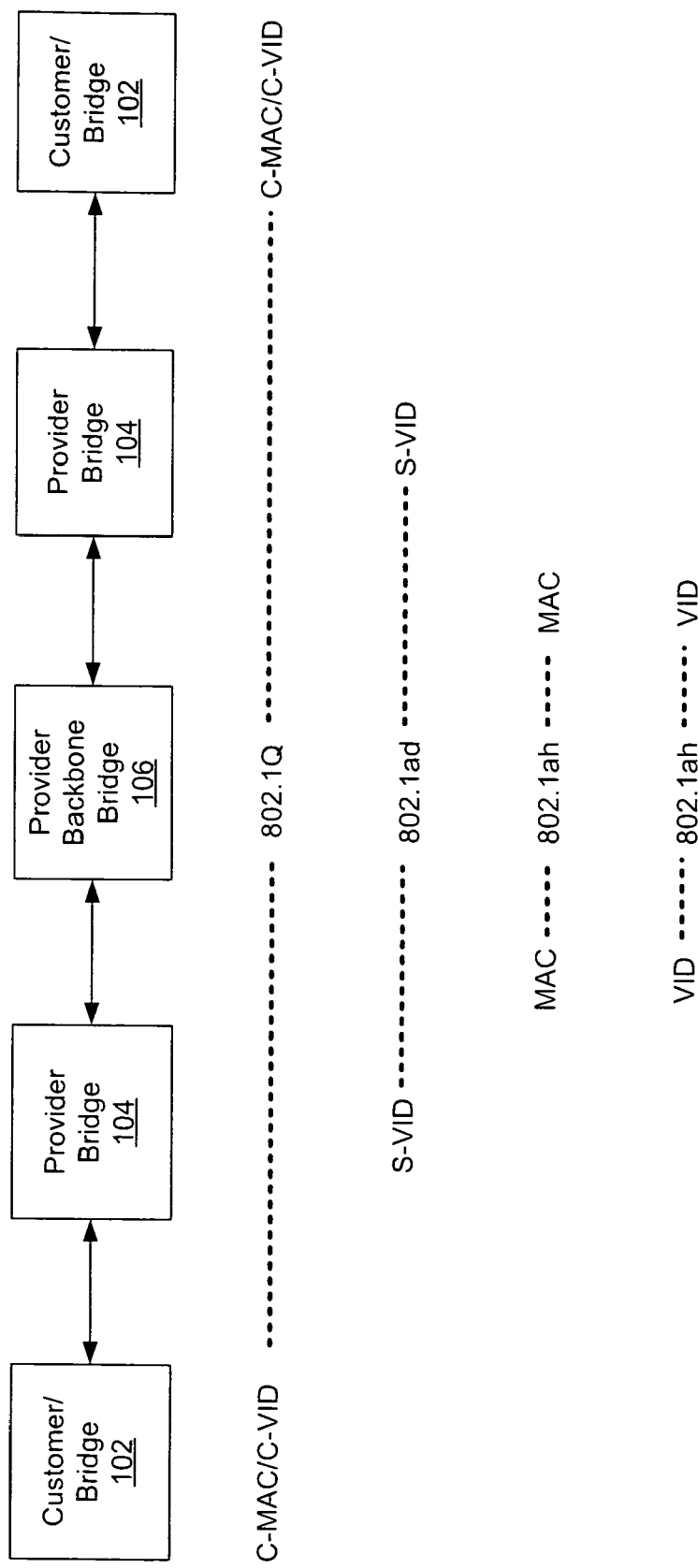
FIG. 1 is a schematic representation of 802.1 MAC/VLAN hierarchy.

In addition to well understood GMPLS terms, terminology from IEEE 802.1 and the following terms are used:
MAC: Backbone MAC
VID: Backbone VLAN ID
B-VLAN: Backbone MAC
C-MAC: Customer MAC
C-VID: Customer VLAN ID
DA: Destination Address
ESP: Ethernet Switched Path
PBB: Provider Backbone Bridge
PBT: Provider Backbone Transport
SA: Source Address
S-VID: Service VLAN ID Ethernet consists of a very simple and reliable data plane that has been optimized and mass produced. To enable 802.1 to scale to large network a hierarchy between bridges has been defined as shown in FIG. 1. Customer bridges 102 at the edge of the network define a C-MAC and C-VID for routing traffic entering the provider network as defined by 802.1Q. Provider bridges 104 can then add a S-VID to traffic within the provider network for routing as per 802.1ad. The S-VID is added at the ingress bridge and removed at the egress bridge. Similarly the provider backbone bridges 106 add a MAC and VID unique to the PBB network as per 802.1ah for routing through the backbone network. The MAC and VID can then be used as a VID/MAC tuple for PBT path configuration. The 802.1 hierarchy and the addition of PBT ensures that data can be routed effectively between networks.

PBT redefines the semantics of using the constituent elements to get complete route freedom for each 60 bit entry so long as the overall requirement for global uniqueness is maintained. A PBT design decision was to preserve the global uniqueness and semantics of MAC addresses as interface names, but redefining the semantics associated with administration and use of VLAN values. The VLAN space is partitioned and a range of VIDs (say 'n' VIDs) allocated as only significant when combined with a destination MAC address. With this re-casting of the role of the VLAN tag, it can then be considered VID as an individual instance identifier for one of a maximum of 'n' point-to-point (P2P) connections or multipoint-to-point (MP2P) multiplexed connections (subsequently termed "shared forwarding" to distinguish from simple merges) terminating at the associated destination MAC address. While a VID in the allocated range is not unique on an Ethernet sub-network basis, the VID/MAC DA tuple is, and procedures can be designed to delegate administration of the allocated VID range to the node/interface identified by the DA MAC. While PBT can be manipulated quite simply by a management system, and many of the requisite functions already exist to do so, it is considered advantageous to also specify a distributed means in the form of a signaling system to configure PBT forwarding in a GMPLS environment.

One simple mode of path creation is by configuration. Node by node a path can be created by simple configuration or by a set of commands originating from a management station. One improvement to node by node configuration is to look at single ended provisioning and signaling. The signaling protocol GMPLS already contains many requisite features and may be adapted to signal PBT path setup with protocol and semantic modifications.

In many situations for PBT, the addition of a complete GMPLS control plane may be overkill for the switches or the application. Therefore the problem can be decomposed into Signaling, Routing, Link discovery and Path management. Using all functions of GMPLS is less of an operational overhead than any other combination, however, using only some components of GMPLS can lead to more provisioned parameters than a purely static system.

Figure 2:
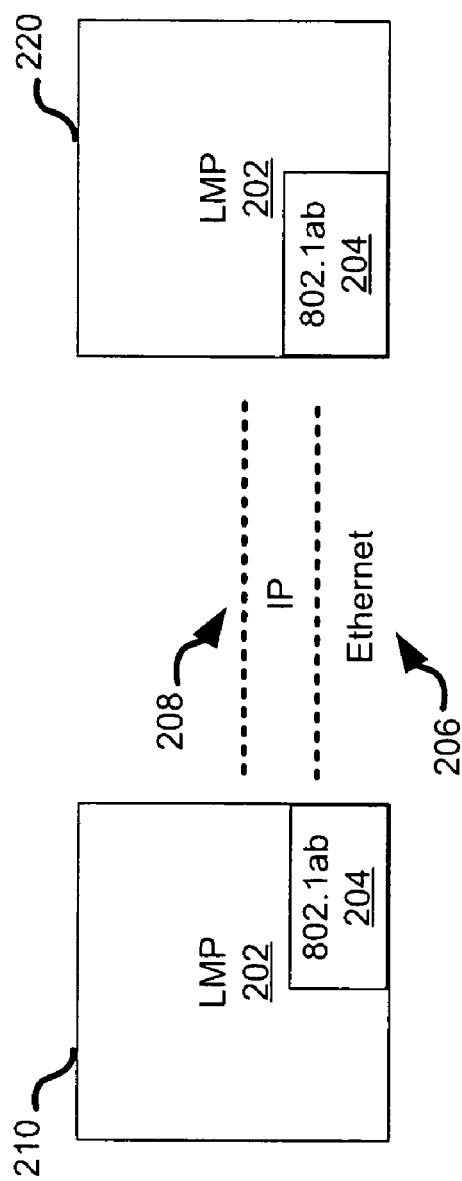
FIG. 2 is a schematic representation of a link discovery hierarchy.

Link discovery is one of the foundations of GMPLS. It is also a capability that has been specified for Ethernet in IEEE 802.1ab standard entitled "Station and Media Access Control Connectivity Discovery". All link discovery is optional but the benefits of running link discovery in large systems are significant. 802.1ab could be run with an extension to feed information into a Link Management Protocol (LMP) based discovery. The LMP based discovery would allow for a complete functional LMP for the purpose of GMPLS topology discovery. LMP requires an IP control plane (as does GMPLS). 802.1ab, does not have the ability to carry all of the LMP messages. So the LMP implementation would be compatible with 802.1ab but add the extensions for LMP discovery as shown in FIG. 2. Each node 210 and 220 may have a LMP module 202 which provides connectivity at the IP layer 208, if utilized as other protocols may be used. The LMP also implements 802.1ab 204 connectivity discovery as a sub-process which operates over the Ethernet layer 206.

In order to have a GMPLS control plane, an IP control plane consisting of and Interior Gateway Protocol (IGP) with Traffic Engineering (TE) extension needs to be established. This foundation of routing and traffic engineering parameters is used to establish control channels with only minimal capability to forward IP packets.

The IP control plane can be provided as a separate independent network or integrated with the Ethernet switches. If it is a separate network, it may be provided as a Layer 2 connected VLAN where the Ethernet switches are connection via a bridged network or HUB. It may also be provided by a network that provides IP connectivity where a IP VPN provides the IP connectivity.

If the IP control plane is integrated with the switches it may be provided by a bridged VLAN that uses the data bearing channels of the network for adjacent nodes. This ties the fate of PBT service and the IP control plane links, however the same Ethernet hardware is already being shared.

GMPLS signaling is the well suited to the set up of PBT switched paths. GMPLS signaling uses link identifiers in the form of IP addresses either numbered or unnumbered. If LMP is used the creation of these addresses can be automated. If LMP is not used there is an additional provisioning requirement to add GMPLS link identifiers. For large implementations LMP would be beneficial. As mentioned earlier the primary benefit of signaling is the control of a path from an endpoint. GMPLS can be used to create bidirectional or uni-directional paths, bi-directional paths being the preferred mode of operation for numerous reasons (OAM consistency etc.).

To use GMPLS RSVP-TE (Resource Reservation Protocol: Traffic Extension) for signaling, a new label signaling object is defined that contains the VID/MAC tuple, which is 60 bits. On the initiating and terminating nodes, a function administers the VIDs associated with the initiating and terminating MACs respectively.

To initiate a bidirectional path, the initiator of the PATH message uses GMPLS signaling procedures such as:

Sets the LSP encoding type to Ethernet.
Sets the LSP switching type to L2SC.
Sets the GPID to unknown.
Sets the UPSTREAM_LABEL to the VID/MAC tuple for the path to the originator, where the VID is administered by the originator from the range reserved for PBT forwarding.

At intermediate nodes the UPSTREAM_LABEL object and value is passed unmodified.

At the termination, a VID is allocated in the PBT range delegated to PBT operation for the termination MAC to provide a label to be used for the path to the termination and the VID/MAC tuple is passed in the GENERALIZED_LABEL object in the RESV message.

Intermediate nodes use the GENERALIZED_LABEL object and pass it on unchanged, upstream towards the originator.

The VID/MAC tuples extracted from the UPSTREAM_LABEL and GENERALIZED LABEL objects are installed in the forwarding table at each hop.

Note that there is no syntax in signaling to force the label in the UPSTREAM_LABEL and GENERALIZED_LABEL objects to be passed unchanged, and so the semantics of the new label type are that the label is passed unchanged. This has similarity to how a wavelength label is handled at an intermediate node that cannot perform wavelength conversion.

Known GMPLS path computation techniques may be utilized to determine the PBT path through the network. Path computation in GMPLS generates explicit route objects (EROs) that can be used directly by GMPLS signaling. Depending on the physical topology the explicit route object (ERO) may be trivial to calculate or more elaborate. Path computation can be done on a centralized database or done locally if required. Some form of path protection either based on Fast Reroute techniques or local computation may also be desirable for network outages but the targeted service for this is long lived relatively static paths.

PBT routing can be implemented with no modifications (node and interface identification can be used as specified), or may employ centralized concepts such as the path computation element. However it is possible to design switches without routing that could proxy their routing to other larger switches. From the routing perspective there would be little difference in the routing database but the small switches would not have to perform routing operations. The information for the proxied routing might be configured or it might be data filled by an automated procedure.

LMP is optional as mentioned earlier. The primary benefit of LMP over 802.1ab is LMP's capability for optimizing routing information for the purpose of link bundling on large switches. LMP has the capability to compress the information required to represent a large number of parallel resources automatically.

Figure 3:
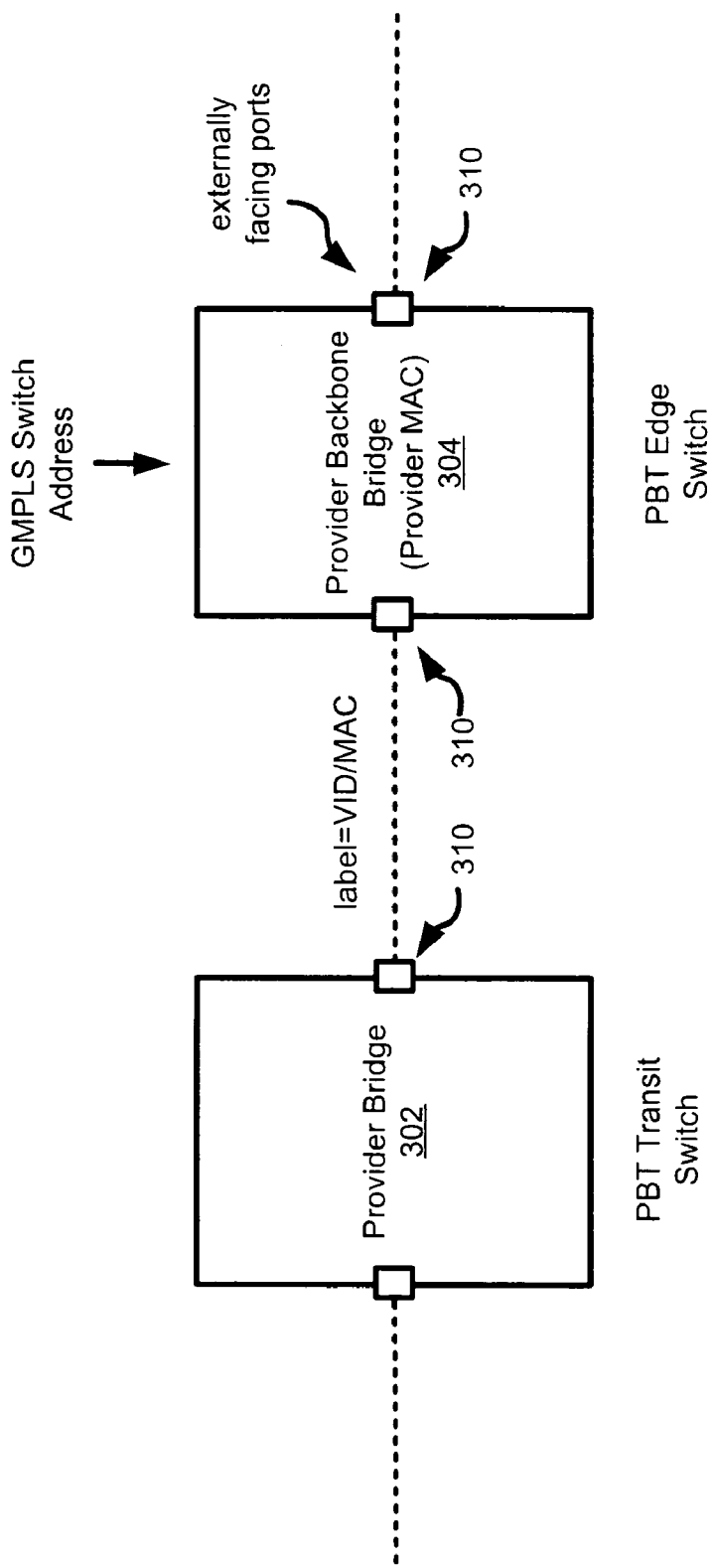
FIG. 3 is a schematic representation of Ethernet/GMPLS addressing and label space.

For a GMPLS based system the GMPLS node address/logical port is the logical signaling identifier for the control plane via which Ethernet layer label bindings are solicited as shown in FIG. 3. To create a point-to-point path between the PBT transit switch 302, a provider bridge, to the PBT edge switch 304, a provider backbone bridge, an association must be made between the ingress and egress nodes defined by the VID/MAC Ethernet label. The specific ports 310 of the GMPLS switch address on a Provider network node are identified by a MAC, a 32 bit IPv4 node address, a 128 bit IPv6 address plus 32 bit port Identifier, and one (or more) mnemonic string identifiers based on the port index and MAC. However, the actual PBT label distributed via signaling and instantiated in the switch forwarding tables contains the egress interface name (MAC) of the port on the egress PBB. Depending on how the service is defined and set up, one or more of these labels may be used for actual setup. It is also to be noted that although it is possible for a terminating node to offer any 60 bit label value that can be guaranteed to be unique, the convention of using MAC addresses to name specific ports is retained, an Ethernet port name being common to both PBT and bridging modes of operation. One implication of this is that a port index and a MAC address of a port on the node may be effectively interchangeable for signaling purposes although incorrect information can result in an incorrect association between a GMPLS node address and the set of MAC named interfaces local to that node.

GMPLS uses identifiers in the form of 32 bit number which are in the IP address notation but these are not IP addresses. An IP routing control plane for the propagation of TE information may be supported. The provider MAC addresses are exchanged by the link layer discovery protocol (LLDP) and by LMP if supported. Actual label assignment is performed by the signaling initiator and terminator. This multiple naming convention leaves the issue of resolving the set given one of the port identifiers. On a particular node, mapping is relatively straight forward. The preferred solution to this is to use the GMPLS IP node address for signaling resolution.

In so doing, the problem of setting up a path is reduced to figuring out what node supports a MAC address and then finding the corresponding GMPLS IP node address and performing all signaling and routing with respect to the GMPLS node address. There are several options to achieve this: provisioning; auto discovery protocols that carry MAC address (e.g. 802.1ab); augmenting routing TE with MAC addresses and name servers with identifier/address registration.

The data plane for PBT has three key fields, VID, MAC DA and MAC SA. A connection instance is uniquely identified by the MAC DA, VID and MAC SA for the purpose of the provider network terminations. The VID and MAC DA tuple identifies the forwarding multiplex at transit switches and a simple degenerate form of the multiplex is P2P (only one MAC SA/VID/MAC DA connection uses the VID/MAC DA tuple). This results in unique labels end to end and no merging or multiplexing of tunnels. The data streams may merge but the forwarding entries are unique allowing the connection to be de-multiplexed downstream.

Therefore the VID/MAC DA can be considered to be a shared forwarding identifier for a multiplex consisting of some number of P2P connections each of which is distinctly identified by the concatenation of the MAC SA with the VID/MAC DA tuple.

Figure 4:
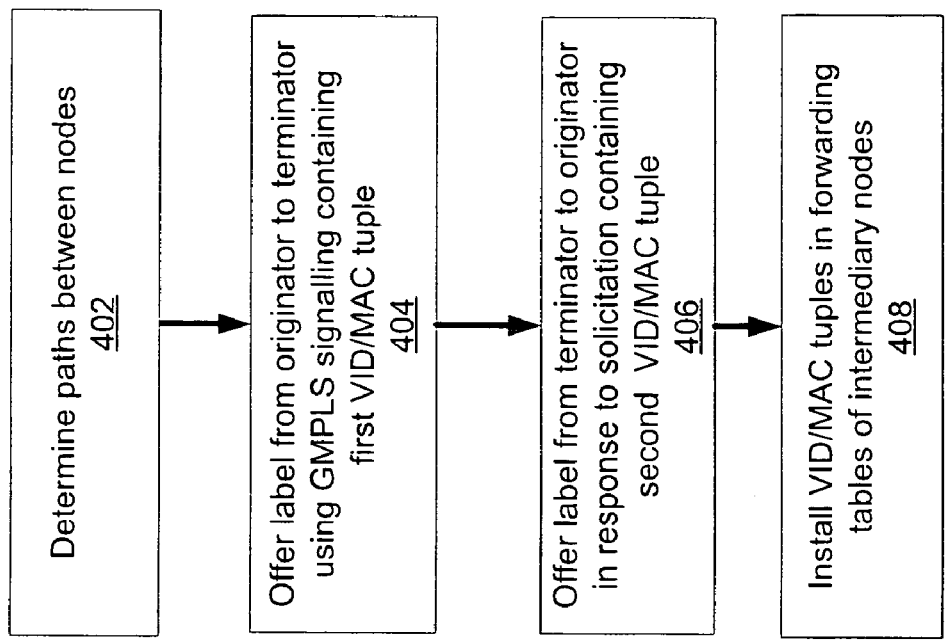
FIG. 4 is a method diagram for GMPLS control of Ethernet.

FIG. 4 is a method flow of configuring Ethernet PBT paths by GMPLS. The paths between two edge nodes is computed at step 402. As noted previously the path computation may be done centrally or at each node. Once a path has been determined, a PATH request in a GMPLS label such as the UPSTREAM_LABEL object and value is passed unmodified between an originator node to a terminator node at step 404 through the intermediary or transit nodes identifying a VID/MAC to identify the path. At the terminator or destination, a VID is allocated in the PBT range delegated to PBT operation for the MAC DA and the VID/MAC tuple is passed in the GENERALIZED_LABEL in the RESV message in the reverse direction at step 406. Upon seeing the response RESV message the intermediary nodes install the appropriate VID/MAC DA tuples in the forwarding table at each hop at step 408.

Figure 5:
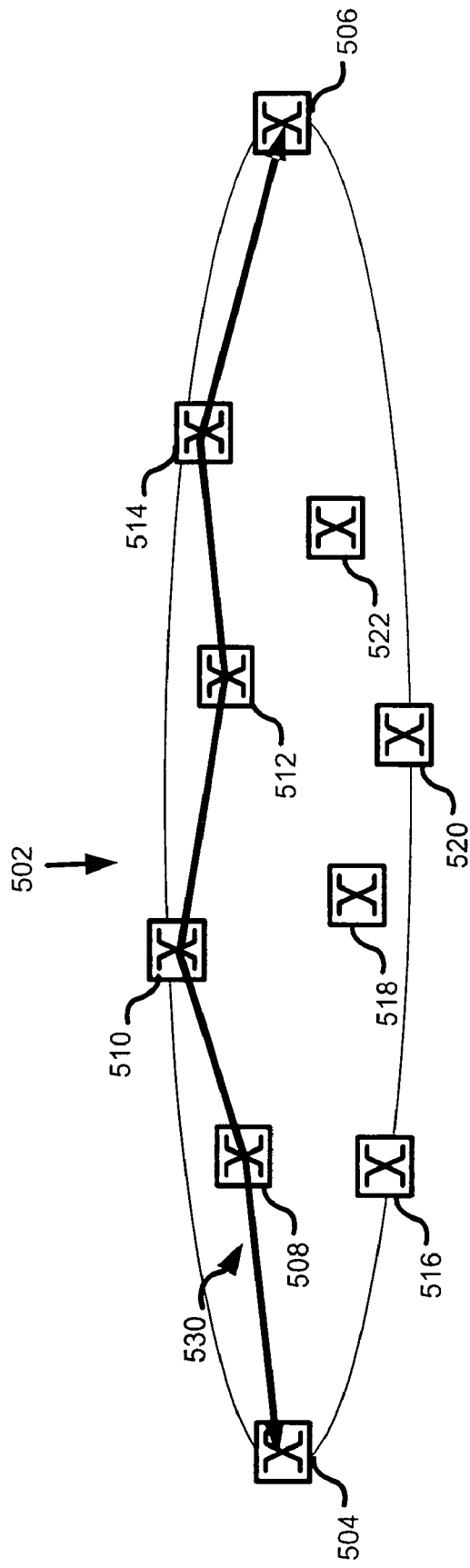
FIG. 5 is a schematic representation of a PBT overlay in a GMPLS network.

As shown in FIG. 5, a network 502 contains multiple interconnected nodes. A connection between an edge node 504 to another edge node 506 can be established by configuring intermediary bridge nodes. Once a path has been computed between the nodes, the originating or source node, in this example 504, offers VID/MAC tuple using the node 504 SA in the GMPLS UPSTREAM label object contained is a PATH setup transaction to intermediate node 508. The signaling continues to propagate along the path to terminating or destination node 506. Terminating node 506 selects a VID/MAC tuple label and offers it in a label object contained in a RESV transaction back along the path towards the originating node 504. The intermediate nodes 508, 510, 512, and 514 on observing both the outgoing PATH request and RESV response install the labels corresponding to both directions of the path in their forwarding tables. It should be understood that alternative GMPLS messages may be utilized to pass VID/MAC labels between edge nodes other than those specified. In addition, the VID/MAC tuples offered by the originating and terminating nodes may specify the MAC SA or MAC DA depending on the format and direction of the messaging.

Once the forwarding tables of the intermediary nodes have been populated with the appropriate VID/MAC information, a PBT path 530 is established in both directions between edge nodes 505 and 506. The VID used for each direction may be the same VID for consistency but PBT does not preclude the use of another VID. It should be noted that the procedures are as for GMPLS as specified, with the proviso that the PBT "labels" are unmodified in each direction as signaling is relayed across the intermediate nodes.

Figure 6:
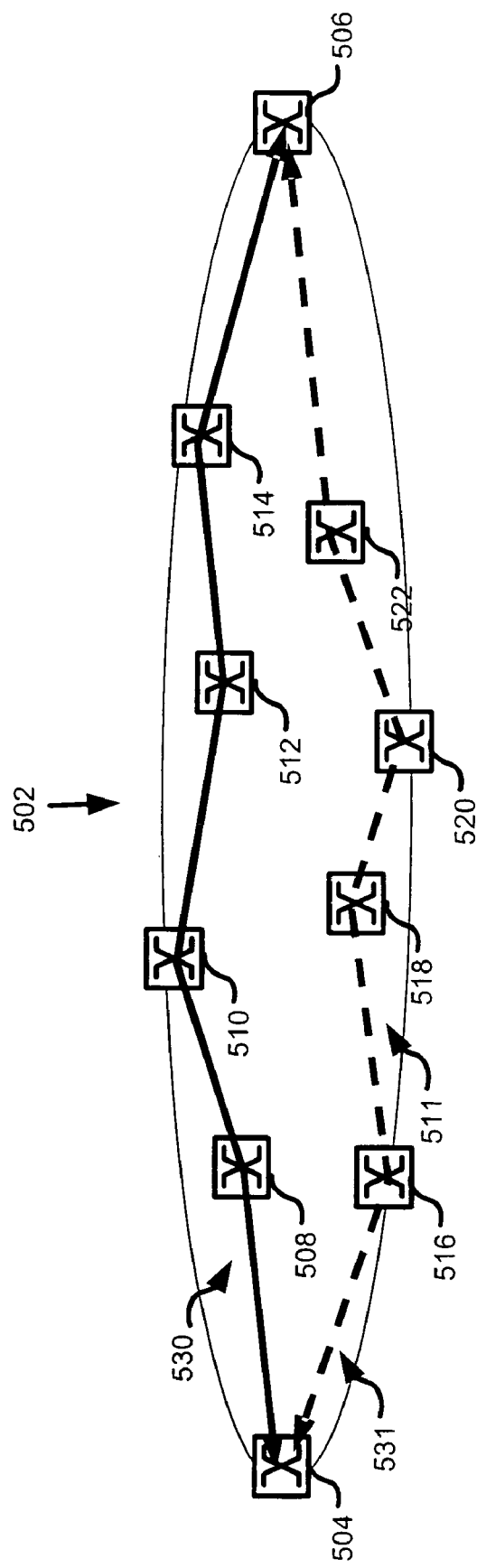
FIG. 6 is a schematic representation of a PBT overlay in a GMPLS network showing a plurality of PBT paths.

As shown in FIG. 6 multiple paths may be established between edge nodes 504 and 506 but utilizing a different VID as defined by PBT. A secondary path 531 utilizing node 516, 518, 520 and 522 may be created by forwarding a different unique VID/MAC. The separate paths could also be created and used independently in the forward and reverse direction resulting in path asymmetry.

One advantage of the PBT mode of operation is the scalability enhancement destination based forwarding permits. VLAN tagged Ethernet packets include priority marking. This means that the queuing discipline applied is selectable on a per flow basis and is decoupled from the actual steering of the packet at any given node. This greatly simplifies the task of setting up paths with a shared forwarding entry, as there are no specific QoS constraints directly associated with the VID/MAC tuple. As noted earlier, GMPLS signaled paths can have similar properties to MPLS traffic engineered E-LSPs. What this means is that multiple Ethernet switched paths to a destination may be considered functionally equivalent. This is a useful property when considering setup of shared forwarding Ethernet switched paths. A terminating node will frequently have more than one suitable candidate path with which new path requests may be multiplexed on the data plane (common VID/DA, unique SA).

Dynamically established P2P (Point-to-Point) symmetry with shared forwarding similar to how a destination node may select a VID/MAC DA from the set of existing shared forwarding multiplexes rooted at the destination node, the originating node may also do so for the reverse path. Once the initial ERO has been computed, the originating node may select the optimal (by whatever criteria) existing shared forwarding multiplex for the new destination to merge with and offer its own VID/MAC DA tuple for itself as a destination. This is identified via use of the UPSTREAM_LABEL object. Similarly, the terminating node performs a selection process whereby the ERO is compared to the existing set of multiplexes and the VID/MAC tuple selected for offering identifying what the terminating node considered to be the optimal tree for the originating node to join. The intermediate nodes simply note the addition of an endpoint "owner" to the shared portion of the multiplexes identified by the ERO and VID/MAC tuples, and the addition of the new "leaves" to the each multiplex as the connectivity is extended to the new end points.

Normally the originating node will not have knowledge of the set of shared forwarding path rooted on the destination node. Use of a Path Computation Server or other planning style of tool with more complete knowledge of the network configuration may wish to impose pre-selection of the a more optimal shared forwarding multiplexes to use for both directions. In this scenario the originating node uses the SUGGESTED_LABEL and UPSTREAM_LABEL objects to indicate complete selection of the shared forwarding multiplexes at both ends. This may also result in the establishment of a new VID/MAC DA path as the SUGGESTED_LABEL object may legitimately refer to a path that does not yet exist.

Intermediate nodes processing signaling transactions for shared forwarding frequently will already have forwarding entries corresponding to the MAC/VID tuple in the signaling exchange. They may contribute to the robustness of the procedure by notifying peers of signaling exceptions, such as when signaling exchange would incorrectly modify the connectivity of an existing path.

The invention claimed is:
1. A method of utilizing Generalized Multi-protocol Label switching (GMPLS) to control Ethernet provider backbone transport (PBT) paths, the method comprising the steps of:
  determining a path from an originating edge node to a terminating edge node through at least one intermediate node;
  in either the originating edge node or the terminating edge node, comparing a GMPLS explicit route object (ERO) associated with the path to an existing set of shared forwarding multiplexes, and selecting a backbone virtual local area network identifier (VID) and a media-access-control (MAC) address in a first VID/MAC tuple which identifies what the terminating edge node considers to be an optimal shared forwarding multiplex for the originating edge node to join;

sending, from the originating edge node to the terminating edge node, a first GMPLS label for identifying the path, the first GMPLS label containing the first VTD/MAC tuple; and using the first VID/MAC tuple for the path in a respective forwarding table of each intermediate node;

wherein when the comparing and selecting steps are performed in the terminating node, the first VIP/MAC tuple is communicated to the originating node via a GMPLS control plane; and wherein when the comparing and selecting steps are performed in the originating node, information of the optimal shared forwarding multiplex is communicated to the originating node via the GMPLS control plane.

2. The method of claim 1 further comprising, in response to the first GMPLS label, the step of:

sending, from the terminating edge node to the originating edge node, a second GMPLS label for identifying the path, the second GMPLS label containing a second VIP/MAC tuple.

3. The method of claim 2 further comprising the step of:

installing the second VIP/MAC tuple in the respective forwarding table of each intermediate node.

4. The method of claim 2 wherein the first GMPLS label is a UPSTREAM_LABEL object and the second GMPLS label is a GENERALIZED_LABEL object in a RESV message.

5. The method of claim 1 wherein the VID/MAC tuple in the first GMPLS label comprises a 12 bit VIP and a 48 bit MAC destination address or group multicast address.

6. The method of claim 1 wherein the MAC address in the first VID/T4AC tuple is associated with the originating edge node.

7. An Ethernet network, utilizing Generalized Multi-protocol Label Switching (GMPLS) for establishing provider backbone transport (PBT) paths, the network comprising:

an originating edge node;

a terminating edge node; and a plurality of intermediate nodes forming a mesh between the originating and terminating edge nodes;

wherein a path is defined between the originating edge node and the terminating edge node through at least one intermediate node, the path being identified by a GMPLS label containing a backbone virtual local area network identifier (VID) and a media-access-control (MAC) address in a VID/MAC tuple, and wherein each intermediate node of the path installs the VID/MAC tuple in a respective forwarding table to route data between the originating edge node and the terminating edge node; and wherein the VID/MAC tuple is selected in either the originating edge node or the terminating edge node using a selection process in which a GMPLS explicit route object (ERO) associated with the path is compared to an existing set of shared forwarding multiplexes to find an optimum shared forwarding multiplex for the originating edge node to join, and the VID/HAC tuple identifying what the terminating edge node considers to be the optimal shared forwarding multiplex;

wherein when the comparing and selecting steps are performed in the terminating node, the VID/MAC tuple is communicated to the originating node via a GMPLS control plane; and wherein when the comparing and selecting steps are performed in the originating node, information of the optimal shared forwarding multiplex is communicated to the originating node via the GNPLS control plane.

8. The network of claim 7 further comprising a path computation server for determining the path between the originating edge node and the terminating edge node through the at least one intermediate node in a GMPLS network topology.

9. The network of claim 8 wherein the GMPLS topology is determined by a Link Management Protocol (LMP) using 802.1ab extensions.

10. The network of claim 7 wherein the VID/MAC tuple is associated with a GMPIJS port index of a selected one of the originating edge node and the terminating edge node.

11. A method performed by an Ethernet bridging node in a mesh network, the method comprising steps of:

receiving a first Generalized Multi-protocol Label Switching (GMPLS) label from a first edge node, the first GMPLS label identifying a provider backbone transport (PBT) path through the mesh network between the first edge node and a second edge node, the first GMPLS label containing a backbone virtual local area network identifier (VID) and a media-access-control (MAC) address associated with the first edge node in a VID/MAC tuple;

using the first GMPLS label VID/MAC tuple in a forwarding table of the Ethernet bridging node, the first GMPLS label VID/MAC tuple identifying an egress port of the Ethernet bridging node associated with the PBT path, wherein packets received at an ingress port of the Ethernet bridging node are forwarded to the egress port of the Ethernet bridging node based on VID/MAC tuples in the packets; and forwarding the first GMPLS label to a next node along the PBT path toward the second edge node of the PBT path;

wherein the first GMPLS label VID/MAC tuple is selected in either the first edge node or the second edge node using a selection process in which a GMPLS explicit route object (ERO) associated with the PBT path is compared to an existing set of shared forwarding multiplexes to find an optimum shared forwarding multiplex for the first edge node to join, the first GMPLS label VID/MAC tuple identifying what the second edge node considers to be the optimal shared forwarding multiplex;

wherein when the comparing and selecting steps are performed in the second edge node, the first GMPLS label VID/MAC tuple is communicated to the first edge node via a GMPLS control plane; and wherein when the comparing and selecting steps are performed in the first edge node, information of the optimal shared forwarding multiplex is communicated to the first edge node via the GMPLS control plane.

12. The method of claim 11 wherein a second GMPLS label is received from the second edge node, the first and second GMPLS labels identifying respective unique first and second VID/MAC tuples for forwarding packets to the associated edge node.

13. The method of claim 12 wherein the first and second VID/MAC tuples are installed in the forwarding table of the Ethernet bridging node such that packets received at ingress ports of the Ethernet bridging node are forwarded along the PBT path by the egress ports based upon the VID/MAC tuple in each of the packets.

14. The method of claim 11 wherein the first GMPLS label is received at the Ethernet bridging node in an UPSTREAM_LABEL object or a GENERALIZED_LABEL object.

* * * * *